Nov. 19, 1935. H. TOUSSAINT 2,021,272
PIT PROP
Filed Dec. 31, 1931
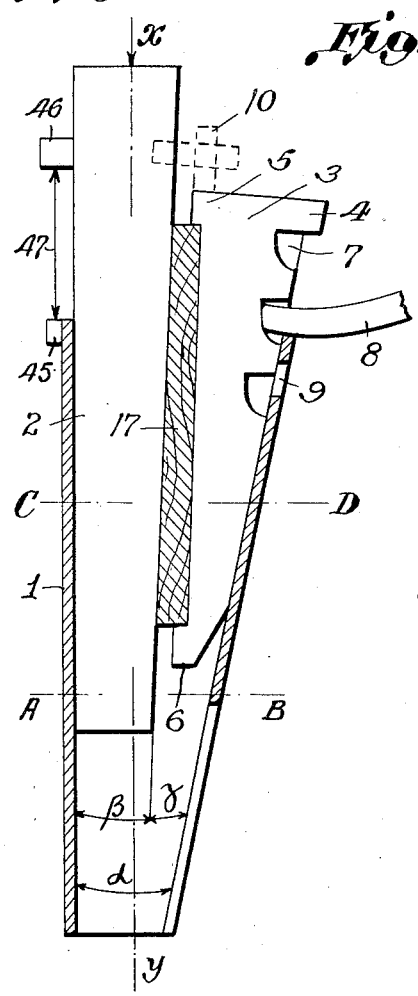
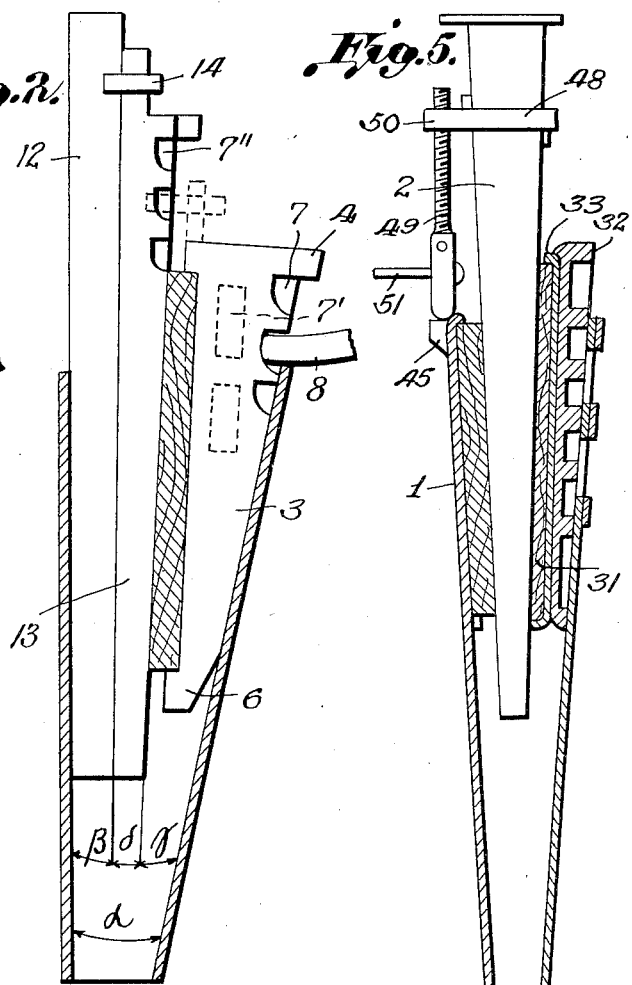
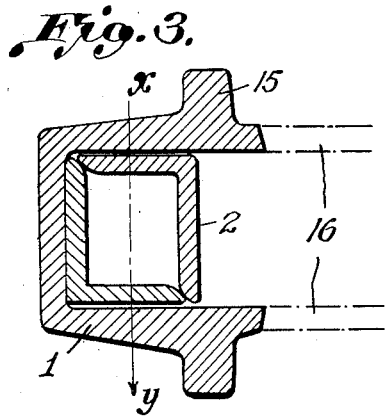
Inventor:
Heinrich Toussaint
By B. Singer, atty.

UNITED STATES PATENT OFFICE 2,021,272

PIT PROP

Heinrich Toussaint, Berlin-Lankwitz, Germany

Application December 31, 1931, Serial No. 584,300
In Germany April 4, 1931

3 Claims. (Cl. 248—354)

My invention relates to a pit prop consisting of two relatively movable sections, which by means of wedges, friction members, connecting devices or slide arrangements may be adjusted for any definite initial pressure and any definite length as well as to offer a resistance which initially increases rapidly and then gradually, the pit prop according to the invention permitting moreover of a gradual collapse and removal under remote control. The wedge or wedges are disposed between the flank surfaces of the telescoping or adjacently disposed prop sections or else in a separate clasp and friction or compressible linings are provided either loose or in association with the wedge or prop sections.

Wedges and props or the components thereof consist of metal, preferably iron. Recesses, lugs, connecting means and the like are provided in the prop sections and the wedges so that selected portions can be compelled to execute a positive motion, whereby the desired relative adjustments are effected with great reliability. On the other hand it is possible to insert between the individual components means for increasing the capacity for the components to slide, in order to obtain a more rapid relative motion between these components.

Furthermore, these relative motions can also be regulated by the individual components abutting against each other with surfaces of varying angle of obliquity, so that resisting forces of differing magnitude occur in succession with the same prop. Also the capacity for relative motion between individual components of the prop can be augmented by interposing means reducing friction, such as rollers, slide-surfaces and the like. The course taken by the resistance, offered by the prop and by the motion of the prop can be adapted to the conditions obtaining at the individual working points and particularly to the nature of the roof, because the development of the pressure can be completely controlled.

The two relatively movable sections can be extended to the needful pressure for the cover and the friction or slide arrangements can be put in in this position.

Certain embodiments of the invention are shown in the accompanying drawing, in which:

Fig. 1 shows a longitudinal section through a pit prop with one wedge.

Fig. 2 shows a longitudinal section through a pit prop with two wedges.

Fig. 3 is a cross-section taken along the line A—B of Fig. 1.

Fig. 4 is a cross section taken along the line C—D of Fig. 1.

Fig. 5 is a longitudinal section through a modified embodiment of the invention.

The pit prop of Figs. 1, 3, and 4 consists of a wedge shaped sheath 1 open at its smaller end in which is accommodated a prop section 2 which also is tapered. Within the sheath section 1 is also provided a wedge 3, which in its lowermost position engages the edge of the sheath 1 with a projecting lug 4. Instead of the lug 4 a point of support can suitably be provided in the inner surface of the outer sheath.

A friction lining is disposed between projections 5 and 6 on the wedge, for example in the form of a wooden board 17 and on the side of the wedge abutting against the wall of the sleeve are provided apertures 7 which serve to receive a lever 8 for removing the wedge. Openings 9 are provided in the sheath to receive the lever when the wedge has slid farther into the sheath. The openings 7 in the wedge and the openings 9 in the sheath could be provided in a plane at right angles to that shown, as indicated at 7'.

The section 1 bears a projection 45 and the section 2 a projection 46 and both serve for the extending of the two sections as indicated by an arrow 47.

The wedge 3 may be attached to the prop section 2 by means of a loop 10 and pin 11. When load is applied to the prop the effect of the angle of taper $\alpha$ becomes operative and with increasing yield the projection 4 comes into contact with the edge of the sheath. As now the prop section 2 alone can continue to telescope within the sheath, the angle $\beta$ determines the resistance. The connection by means of 10 and 11 is only necessary if the frictional forces between prop section 2 and friction lining 17 are too small to ensure a common operation of all components within the sheath, i. e. the prop section 2, the friction lining 17 and the wedge 3. If the prop section 2 is prismatic in form then the pressure does not increase after the lug 4 has encountered the edge of the sheath.

In the prop of Fig. 2, the inner prop section 2 is divided into the tapering members 12 and 13, the member 3 being furnished with apertures 7 for enabling adjustment in respect of height by means of the lever 8. The wedge member 13 is connected with the load carrying member 12 by means of pin 14. In this case, use may be made of the angles $\alpha$, $\beta+\delta$ or $\beta$ alone as desired to take up the load. The pressure curves take a corresponding course. The ordinate $o$—$u$ denotes the pressure, and the abscissa $o$—$z$ the yielding. With the angle $\alpha$ the curve arises steeply from $o$ to $p$; now acts a little angle $\beta$ and the curve runs in the direction $p$—$s$. If several different angles act one after the other—$\alpha$, $\beta+\delta$, $\beta$—the curve next runs from $o$ to $p$ according to the angle and further to $z$ according to the angle $\beta+\delta$ and hereupon to $w$ according to the angle. If lastly a prismatic inner section comes in operation the curve runs in the direction $p$—$v$ or $p$—$v'$.

As is seen from Figs. 3 and 4 the outer sheath 1 is provided with attached or integral loops 15 and axial lines of pressure and of weight $x$, $y$, coincide, which can also be attained by extending the ties 16 as shown in dotted lines in Fig. 3. The prop section 2 consists of two angle irons welded together. Also at the expanded part, the outer sheath 1 is formed by welding two U-shaped iron members. The wedge 3 can have the I-form as shown in Fig. 4.

In Fig. 5, a metallic skid plate 33 is placed between friction lining 31 and wedge 32, so that only the friction lining 31 participates with the plate 33 in the motion of the inner pile section 2, because the friction with the wooden friction lining 31 is greater than between the metallic plate 33 and the metallic wedge 32. A band 48 with a female screw 50 is affixed to the section 2 and on the projection 45 is placed a screw 49 for extending the section by turning with a lever 51.

I claim:

1. A pit prop consisting of two relatively movable members, one provided with tapered lateral surfaces and the other arranged between said lateral surfaces, a wedge-shaped member arranged between opposing surfaces of the two first named members, a friction and crushing element arranged between the wedge and one of the first named members, and metal elements by which the friction and crushing element is enclosed, and means for moving the said wedge and the crushing or friction element.

2. A pit prop consisting of two telescopically related members, one of which is wedge-shaped and the other arranged in said wedge-shaped member, a wedge arranged between one wall of the wedge-shaped member and the other member, a crushing and friction element arranged between said wedge and the other member and a metal intermediate plate arranged between the wedge and the crushing and friction member, and means for moving said wedge and said crushing and friction member.

3. A mine prop comprising telescopically related members one of which is wedge-shaped, squeezing or friction elements arranged against opposite sides of the other member and one of which bears against the opposing side of the wedge-shaped member and a wedge arranged between the other friction or squeezing member and the opposing side of said wedge-shaped member.

HEINRICH TOUSSAINT.